United States Patent Office 3,226,447
Patented Dec. 28, 1965

3,226,447
DIRECTED NUCLEAR SUBSTITUTION-CHLORINATION OF AROMATIC HYDROCARBONS AND HALOGENATED AROMATIC HYDROCARBONS
George Herbert Bing and Roman Abraham Krieger, Sydney, New South Wales, Australia, assignors to Union Carbide Australia, Ltd., a limited company of Australia
No Drawing. Filed Dec. 22, 1960, Ser. No. 77,532
13 Claims. (Cl. 260—650)

This invention relates to a process for the directed nuclear substitution-chlorination of toluene and benzenes by chlorine.

The substitution-chlorination of benzene and chlorobenzene so as to produce di-, tri- and tetra-chlorobenzene has long been known. It has been customary to employ chlorination catalysts such as iron, ferric chloride, aluminum chloride, antimony chloride and the like (sometimes referred to as "halogen carriers") to facilitate the reaction. However, once chlorination proceeds beyond the stage of mono-chlorination, complex mixtures are produced, since there are three isomeric dichlorobenzenes, three isomeric trichlorobenzenes and three isomeric tetrachlorobenzenes. These isomeric chlorobenzenes are not produced in equal proportions, and they are not of equal commercial value. Currently, for instance, para-dichlorobenzene is of more value than the isomeric ortho-dichlorobenzene; while 1,2,4,5-tetrachlorobenzene has a larger use than the isometric 1,2,3,4-tetrachlorobenzene. Furthermore, their separation can be difficult and thus costly; e.g. meta-dichlorobenzene boils at 172° C. and para-dichlorobenzene boils at 174° C., and in consequence the separation of these isomers by a simple fractional distillation is not possible. Obviously, it is highly desirable to be able to influence the position in the nucleus taken up by the second or subsequent chlorine atom in relation to the first chlorine substituent in the benzene molecule. Hitherto, for example, by careful control of chlorination conditions it has been possible in chlorinating benzene or monochlorobenzene to the dichlorobenzene stage to gain a produce wherein the ratio para-dichlorobenzene : ortho-dichlorobenzene is approximately 1.5:1.

According to our invention there is provided a process for the directed nuclear substitution-chlorination of toluene and benzenes by chlorine characterized in that liquid phase chlorination of said compounds is carried out in the presence of a chlorination catalyst chosen from the group consisting of iron, aluminum, antimony and halides thereof (to which has been added a co-catalyst consisting of an organic sulphur compound characterized by divalent sulphur preferably selected from the group consisting of mercaptans, mercapto-aliphatic carboxylic acids, aliphatic thiocarboxylic acids, alkyl sulphides, alkyl disulphides, thiophenols, aryl sulphides, aryl disulphides, perchloromethylmercaptans, thiophenes, tetrahydrothiophenes, dixanthogens, thioureas and products derived therefrom by reactions with halogens.

It is to be noted that certain of the above materials possessing a mercapto group not only react with halogen in a substitution reaction, but may also suffer oxidation so that the mercapto group is oxidized to a disulphide group. Both halogenated and oxidized types of compound are effective co-catalysts for the purposes of our invention.

Whilst specific examples of the co-catalyst of our invention are compounds such as propyl mercaptan, thioglycolic acid, beta-mercaptopropionic acid, thioacetic acid, thiomalic acid, dipropyl sulphide, dipropyl disulphide, thiophenol, toluene-2,4-dithiol, diphenyl sulphide, dipentachlorophenyl disulfide perchloromethyl mercaptan, thiophene, tetrahydrothiophene, dixanthogen, thiourea, dialpha-naphthylthiourea and products derived therefrom by reaction with halogens, we have found that all organic substances characterized by divalent sulphur exhibit para directing influence when used as co-catalyst.

When benzene or monochlorobenzene is chlorinated in the presence of the cataylst of the known art together with the co-catalyst of our invention, to a degree where dichlorobenzenes are the principal product, we find that the ratio of para-dichlorobenzene to ortho-dichlorobenzene can be raised to 3.3:1, and the proportion of meta-dichlorobenzene is significantly reduced. The degree of chlorination can be varied so as to fit particular needs, but in the case of dichlorobenzene it is preferred to work in a range where the reaction product is characterized by a density (measured at 20° C.) in the range 1.05–1.30, i.e. where the amount of dichlorobenzenes in the crude product will vary from 8% to 90% by weight. At a density (measured at 20° C.) of 1.30, a somewhat higher proportion of para-relative to ortho-dichlorobenzene will be obtained, due to the fact that ortho-dichlorobenzene reacts faster with chlorine than does para-dichlorobenzene to form trichlorobenzene.

Para-dichlorobenzene is frequently produced as a by-product in the manufacture of monochlorobenzene. It is known in the art that it is desirable to use for such manufacture a "nitration grade" benzene, i.e. a benzene which contains not more than approximately 1% of toluene, olefines, carbon bisulphide and other sulphur compounds. Otherwise a variety of undesirable by-products is produced.

When benzene is chlorinated, the maximum possible mono-chlorobenzene obtainable in the reaction is approximately 73% w./w., at which stage there is 4–5% of unreacted benzene present together with 22–23% of mixed dichlorobenzenes. A manufacturer of monochlorobenzene therefore has the choice, either (a) to underchlorinate with the result that a lot of unreacted benzene is obtained with consequent cost of recovery by distillation; or (b) to overchlorinate to a stage where there is no significant residue of unreacted benzene, at which point the chlorinated material contains approximately equal weights of monochlorobenzene and (mixed) dichlorobenzene. This latter process is more advantageous if the value of the "by-product" dichlorobenzene is sufficiently high.

If, as generally is the case, the para-dichlorobenzene is a more valuable by-product than ortho-dichlorobenzene, our invention is of particular importance to the manufacturer of monochlorobenzene whose process results in a dichlorobenzene component. For example, if such a process produces 50 parts of dichlorobenzene, the prior art would result in approximately 30 parts of para-dichlorobenzene and 20 parts ortho-dichlorobenzene. By way of contrast, the process of our invention would give 38.5 parts of para-dichlorobenzene and only 11.5 parts of ortho-dichlorobenzene.

To gain the maximum advantage of our invention when chlorinating benzene or monochlorobenzene, we prefer to work at temperatures between ambient temperature and approximately 60° C., although the co-catalyst is active at higher temperatures. An upper temperature limit for liquid phase chlorination at ambient pressure is, of course, fixed by the boiling point of the reaction mixture at any stage.

Our invention is exhibited in another form in the chlorination of dichlorobenzene and 1,2,4-trichlorobenzene to tetrachlorobenzene. Normally the reaction does not stop at the tetrachlorobenzene stage, and some pentachlorobenzene will be formed before all the 1,2,4-trichlorobenzene has entered into reaction. The alternatives therefore present themselves either to chlorinate fully and thus to form up to 20% of pentachlorobenzene, or to chlorinate partially so as to minimize pentacholorbenzene formation while accepting the necessity to recycle unreacted 1,2,4-trichlorobenzene. The subsequent working up process will in general decide which of these procedures is preferable in any given situation.

Further, a mixture of 1,2,4-tri- and tetrachlorobenzenes derived therefrom has a set point which increases with increasing chlorine content. Nevertheless, as with the chlorination of benzene and monochlorobenzene, we prefer to practice our invention using temperatures between the ambient temperature and 60° C. Therefore we effect the chlorination of a slurry after a certain proportion of chlorine has reacted (the exact constitution of said slurry being dependent on the chlorine content and the temperature). Since the solid first separating from the mixture at the temperature specified is 1,2,4,5-tetrachlorobenzene, and since it is eminently desirable to separate it from the liquid phase to minimize the further chlorination to pentachlorobenzene, the presence of such slurry is no disadvantage, provided adequate agitation of the reaction mixture can be maintained.

Another form of our invention is exhibited in the nuclear substitution-chlorination of toluene. It is known that monosubstitution-chlorination of toluene favors the production of the ortho-isomer. Chlorination of toluene in the liquid phase according to our invention enhances the production of the para-isomer. The improvement is best realized when it is observed that, in producing 100 tons of para-chlorotoluene, it is possible to reduce the production of by-product ortho-chlorotoluene by 40 tons as against the process employing a catalyst of the prior art alone.

Amounts of catalyst within the range 0.02-5% (calculated on compound being chlorinated) are effective, the preferred proportions being in the range of 0.1-3%. If all the co-catalyst is added initially, a part of the co-catalyst appears to be lost to an unreactive tar or vaporized out by the hydrochloric acid, and co-catalyst consumption is therefore at a higher level. Amounts of co-catalyst in excess of the range specified are regarded as uneconomic and can cause difficulty in the working up of the crude chlorinated product.

Although the amount of co-catalyst employed in our invention is small, the amount may be further reduced if, instead of the whole of the co-catalyst being added at the beginning of the reaction, it is added either at intervals or continuously during the reaction.

The analyses cited below were performed by infra-red spectrophotometer, when necessary after removal of unchanged benzene from the reaction mixture by distillation.

The following examples illustrate but in no sense limit the practice of our invention. Examples 1, 12 and 15 illustrate the use of a catalyst of the prior art alone, whereas subsequent examples show by way of contrast the effects of adding the co-catalyst of our invention. All parts expressed are by weight.

*Example 1*

To benzene, 312 parts, were added cast iron borings, 3.12 parts, and chlorine was passed into the mixture for a total period of 6 hours, the temperature being maintained at a level which caused gentle refluxing of the mixture (78-131° C.). The density of the resulting mixture was approximately 1.2 gm./ml. measured at 20° C.

The mixture analyzed as follows:

| | Percent |
|---|---|
| Monochlorobenzene | 58.0 |
| Ortho-dichlorobenzene | 15.0 |
| Para-dichlorobenzene | 23.3 |
| Meta-dichlorobenzene | 0.75 |

This gives a para/ortho ratio of 1.5, and a para/meta ratio of 31.

*Example 2*

To benzene, 312 parts, were added ferric chloride, 1.56 parts, and thioglycolic acid, 1.68 parts, and chlorine was passed into the mixture for a total of 5½ hours, the temperature being maintained at a level which caused gentle refluxing of the mixture (78-135° C.).

The mixture analyzed as follows:

| | Percent |
|---|---|
| Monochlorobenzene | 52.2 |
| Ortho-dichlorobenzene | 14.7 |
| Para-dichlorobenzene | 32.0 |
| Meta-dichlorobenzene | 0.15 |

This gives a para/ortho ratio of 2.2, and a para/meta ratio of 213, which figures are a considerable improvement on Example 1.

Substantially similar results were obtained by adding 0.7 part of thioglycolic acid continuously during the reaction, instead of the initial addition of 1.68 parts of thioglycolic acid described above.

*Example 3*

To benzene, 312 parts, were added cast iron boring, 0.94 part, and thioacetic acid, 0.94 part, and chlorine was passed in for 3 hours while maintaining the mixture at a temperature of 35-38° C. until the density of the mixture was approximately 1.21 gm./ml. measured at 20° C.

The mixture analyzed as follows:

| | Percent |
|---|---|
| Monochlorobenzene | 43.0 |
| Ortho-dichlorobenzene | 12.8 |
| Para-dichlorobenzene | 42.5 |
| Meta-dichlorobenzene | 0.0 |

This gives a para/ortho ratio of 3.3, and no detectable meta-dichlorobenzene.

*Example 4*

To benzene, 268 parts, were added cast iron borings, 0.81 part, and chlorine was passed in for a period of 10½ hours while maintaining the mixture at a temperature of 36-37° C. 0.081 part of thioglycolic acid was added continuously during the reaction.

The mixture analyzed as follows:

| | Percent |
|---|---|
| Monochlorobenzene | 45.3 |
| Ortho-dichlorobenzene | 14.1 |
| Para-dichlorobenzene | 40.5 |
| Meta-dichlorobenzene | 0.1 |

These figures show a slight deterioration as compared to Example 3 but are still very much better than Example 1.

*Example 5*

To monochlorobenzene, 45.0 parts, were added ferric chloride, 2.25 parts, and diphenyl disulphide, 2.25 parts, and chlorine was passed in for 1¼ hours while maintaining the temperature at 35-37° C. until the density of the mixture measured at 20° C. was approximately 1.21 gm./ml.

The mixture analyzed as follows:

| | Percent |
|---|---|
| Monochlorobenzene | 42.9 |
| Ortho-dichlorobenzene | 13.0 |
| Para-dichlorobenzene | 40.0 |
| Meta-dichlorobenzene | 0.0 |

Thus the para/ortho ratio was 3.1.

*Example 6*

To monochlorobenzene, 450 parts, were added ferric chloride, 2.25 parts, and propyl mercaptan, 2.25 parts, and chlorine was passed into the mixture for 1½ hours while maintaining the temperature at 36-39° C. until the density of the mixture measured at 20° C. was approximately 1.21 gm./ml.

The mixture analyzed as follows:

| | Percent |
|---|---|
| Monochlorobenzene | 41.5 |
| Ortho-dichlorobenzene | 13.0 |
| Para-dichlorobenzene | 41.5 |
| Meta-dichlorobenzene | 0.0 |

Thus the para/ortho ratio was 3.2.

*Example 7*

To benzene, 312 parts, were added ferric chloride, 2.1 parts, and thiomalic acid, 1.0 part, and chlorine was passed in for 3⅔ hours while maintaining the temperature of the mixture at 35–37° C. until the density of the mixture measured at 20° C. was approximately 1.23 gm./ml.

The mixture analyzed as follows:

| | Percent |
|---|---|
| Monochlorobenzene | 33.4 |
| Ortho-dichlorobenzene | 18.5 |
| Para-dichlorobenzene | 45.0 |
| Meta-dichlorobenzene | 0.4 |

Thus the para/ortho ratio was 2.37.

*Example 8*

To monochlorobenzene, 450 parts, were added ferric chloride, 2.25 parts, and perchloromethylmercaptan, 2.25 parts, and chlorine was passed into the mixture for 1 hour while maintaining the temperature at 35–39° C. until the density of the mixture measured at 20° C. was approximately 1.22 gm./ml.

The mixture then analyzed as follows:

| | Percent |
|---|---|
| Monochlorobenzene | 40.0 |
| Ortho-dichlorobenzene | 14.1 |
| Para-dichlorobenzene | 42.5 |
| Meta-dichlorobenzene | 0.0 |

Thus the para/ortho ratio was 3.0.

*Example 9*

To benzene, 312 parts, were added cast iron borings, 0.94 part, and thiophene, 0.94 part, and chlorine was passed in for 5⅓ hours while maintaining the temperature at 34–39° C. until the density of the mixture measured at 20° C. was approximately 1.2 gm./ml.

The mixture analyzed as follows:

| | Percent |
|---|---|
| Monochlorobenzene | 44.5 |
| Ortho-dichlorobenzene | 13.3 |
| Para-dichlorobenzene | 41.5 |
| Meta-dichlorobenzene, less than 0.1. | |

Thus the para/ortho ratio was 3.1.

*Example 10*

To monochlorobenzene, 450 parts, were added antimony trichloride, 2.5 parts, and propyl disulphide, 2.5 parts, and chlorine was passed into the mixture for 1½ hours while maintaining the temperature at 35–39° C. until the density of the mixture measured at 20° C. was approximately 1.21 gm./ml.

The mixture then analyzed as follows:

| | Percent |
|---|---|
| Monochlorobenzene | 42.1 |
| Ortho-dichlorobenzene | 13.7 |
| Para-dichlorobenzene | 42.5 |
| Meta-dichlorobenzene | 0.0 |

Thus the para/ortho ratio was 3.1.

*Example 11*

To benzene, 312 parts, were added aluminum chloride, (anhydrous), 1.56 parts, and thioglycolic acid, 3.12 parts, chlorine was passed in for 3 hours, while maintaining the temperature in the range 30–48° C., until the mixture had a density measured at 20° C. of 1.214 gm./ml.

The mixture analyzed as follows:

| | Percent |
|---|---|
| Monochlorobenzene | 41.0 |
| Ortho-dichlorobenzene | 14.0 |
| Para-dichlorobenzene | 46.0 |

Thus the para/ortho ratio was 3.3.

*Example 12*

To 1,2,4-trichlorobenzene, 544 parts, there were added cast iron borings, 5.4 parts, and the mixture was heated to 80° C. Chlorine was passed in, the temperature being allowed to rise up to 100 C., until the mixture had a set point of 89.3° C. A sample of the mixture withdrawn at this stage showed that the ratio of 1,2,4,5-/1,2,3,4-tetrachlorobenzene was 1.85. The introduction of chlorine was resumed, and the mixture was kept molten until the set point reached 106.8° C. A sample of the reaction mixture withdrawn at this point then showed that the ratio of 1,2,4,5-/1,2,3,4-tetrachlorobenzene was 2.28. The apparent improvement in the ratio is largely due to the fact that 1,2,3,4-tetrachlorobenzene chlorinates faster than does 1,2,4,5-tetrachlorobenzene to give pentachlorobenzene.

*Example 13*

To 1,2,4-trichlorobenzene, 544 parts, there were added cast iron borings 5.4 parts, and thioglycolic acid, 5.4 parts, and the mixture was heated to 50° C. Chlorine was passed in and the temperature was maintained at 50–60° C. When the set point of the slurry formed was approximately 63° C., a sample showed that the ratio of 1,2,4,5-/1,2,3,4-tetrachlorobenzene was 3.0.

Chlorination of the slurry was continued within the same temperature limits until the sample gave a set point of approximately 100° C.

A sample analyzed at this point showed a ratio of 1,2,4,5-/1,2,3,4-tetrachlorobenzene of 3.0.

*Example 14*

To 400 parts of a crude mixture of dichlorobenzenes (containing ortho-dichlorobenzene 15.3%, para-dichlorobenzene 46.2%, monochlorobenzene 31.4% and benzene 7.1%) were added cast iron borings, 0.4 part, and thioglycolic acid, 0.8 part, and chlorine was passed into the mixture for 18 hours while maintaining the temperature at 40–60° C. until the set point of the mixture was 102.2° C.

The mixture then analyzed as follows:

| | Percent |
|---|---|
| 1,2,4-trichlorobenzene | 0.4 |
| 1,2,4,5-tetrachlorobenzene | 67.7 |
| 1,2,3,4-tetrachlorobenzene | 22.1 |
| Pentachlorobenzene | 9.2 |

Thus the ratio of 1,2,4,5-tetrachlorobenzene to 1,2,3,4-tetrachlorobenzene was 3.0.

*Example 15*

To commercial toluene, 184 parts, there was added antimony trichloride, 1.66 parts, and chlorine was passed in while the temperature was maintained in the range 10–14° C. When 50 parts of chlorine had reacted, a sample of the product was analyzed as follows:

| | Percent |
|---|---|
| Toluene | 29.5 |
| Ortho-chlorotoluene | 41 |
| Para-chlorotoluene | 25.5 |

That is, of the monochlorotoluene fraction of the reaction product, para-chlorotoluene represented 38%; alternatively, in producing 100 parts of para-chlorotoluene, 161 parts of by-product ortho-chlorotoluene are produced.

*Example 16*

To commercial toluene, 184 parts, there were added antimony trichloride, 1.84 parts, and thioglycolic acid, 1.84 parts, and chlorine was passed in while the temperature was maintained in the range 8–13° C. When 47 parts of chlorine had reacted, a sample of the product was analyzed as follows:

| | Percent |
|---|---|
| Toluene | 34 |
| Ortho-chlorotoluene | 38 |
| Para-chlorotoluene | 31.5 |

That is, of the monochlorotoluene fraction of reaction product, para-chlorotoluene represented 45%; alternatively, in producing 100 parts of para-chlorotoluene, 120 parts of by-product ortho-chlorotoluene are produced.

This is a continuation-in-part of our copending application Serial No. 746,656, filed July 7, 1958, now abandoned, and entitled "Directed Nuclear Substitution-Chlorination of Aromatic Hydrocarbons and Halogenated Aromatic Hydrocarbons."

What we claimed is:

1. An improved process for the production of nuclearly chlorinated benzene and toluene comprising contacting, in the liquid phase, a starting material selected from the group consisting of benzene, chlorinated benzenes containing up to 3 chlorine atoms and toluene, with at least one mole of chlorine per mole of starting material in the presence of a chlorination catalyst selected from the group consisting of iron, aluminum, antimony and halides thereof, to which has been added from 0.02 to 5 per centum, based on starting material, of a co-catalyst consisting of an organic sulfur compound characterized by divalent sulfur and selected from the group consisting of propyl mercaptan, mercapto-aliphatic carboxylic acids, aliphatic thiocarboxylic acids, alkyl sulfides, alkyl disulfides, aryl sulfides, aryl disulfides, perchloromethylmercaptan, tetrahydrothiophene, and dixanthogen, and thereafter separating said chlorinated products from the reaction mixture.

2. The process as claimed in claim 1 wherein said starting material is monochlorobenzene and the chlorinated product is para-dichlorobenzene.

3. The process as claimed in claim 1 wherein said starting material is a dichlorobenzene and the chlorinated product is 1,2,4,5-tetrachlorobenzene.

4. The process as claimed in claim 1 wherein said starting material is 1,2,4-trichlorobenzene and the chlorinated product is 1,2,4,5-tetrachlorobenzene.

5. The process as claimed in claim 1 wherein said starting material is toluene and the chlorinated product is para-chlorotoluene.

6. The process as claimed in claim 2 wherein the chlorination is caried out until the reaction mixture has a specific gravity of from 1.15 to 1.35 at 20° C.

7. The process as claimed in claim 3 wherein the chlorination is carried out until the reaction mixture is characterized by a set point of from 50° C. to 122° C.

8. The process as claimed in claim 4 wherein the chlorination is carried out until the reaction mixture is characterized by a set point of from 50° C. to 122° C.

9. The process as claimed in claim 5 wherein the chlorination is caried out until the reaction mixture is characterized by a specific gravity of from 0.93 to 1.08 at 20° C.

10. The process as claimed in claim 1 wherein the said co-catalyst is thioglycolic acid.

11. The process as claimed in claim 1 wherein the said co-catalyst is thioacetic acid.

12. The process as claimed in claim 1 wherein the said co-catalyst is dixanthogen.

13. An improved process for the production of para-dichlorobenzene as a by-product in the manufacture of monochlorobenzene comprising effecting liquid phase chlorination of a mixture consisting essentially of nitration grade benzene and at least 30 per centum by weight, based on benzene, of monochlorobenzene by at least one-third of an equimolar proportion of chlorine in the presence of a chlorination catalyst selected from the group consisting of iron, aluminum, antimony and halides thereof, to which has been added from 0.02 to 5 per centum, based on starting material, of a co-catalyst consisting of an organic sulfur compound characterized by divalent sulfur and selected from the group consisting of propyl mercaptan, mercapto-aliphatic carboxylic acids, aliphatic thiocarboxylic acids, alkyl sulfides, alkyl disulfides, aryl sulfides, aryl disulfides, perchloromethylmercaptan, tetrahydrothiophene, and dixanthogen, and conducting such chlorination until the reaction mixture is characterized by a specific gravity of from 1.05 to 1.35 at 20° C., and thereafter separating the para-dichlorobenzene from said reaction mixture.

References Cited by the Examiner

UNITED STATES PATENTS

| 1,741,305 | 12/1929 | Jaeger | 260—650 |
| 2,976,330 | 3/1961 | Guerin | 260—650 |

FOREIGN PATENTS

| 223,024 | 7/1959 | Australia. |
| 230,337 | 9/1960 | Australia. |
| 1,202 | of 1905 | Great Britain. |

OTHER REFERENCES

Wiegandt et al.: Ind. & Eng. Chem., vol. 43, pp. 2167–72 (1951).

LEON ZITVER, *Primary Examiner.*

ABRAHAM RIMENS, ALPHONSO D. SULLIVAN,
*Examiners.*